US010855715B2

(12) United States Patent
Martin et al.

(10) Patent No.: US 10,855,715 B2
(45) Date of Patent: Dec. 1, 2020

(54) METHOD FOR PREDICTING SECURITY RISKS OF ASSETS ON A COMPUTER NETWORK

(71) Applicant: Sumo Logic, Inc., Redwood City, CA (US)

(72) Inventors: Gregory Charles Martin, San Francisco, CA (US); Jeffrey J. Guy, Austin, TX (US); Grant Babb, Portland, OR (US)

(73) Assignee: SUMO LOGIC, INC., Redwood City, CA (US)

( * ) Notice: Subject to any disclaimer, the term of this patent is extended or adjusted under 35 U.S.C. 154(b) by 421 days.

(21) Appl. No.: 15/799,827

(22) Filed: Oct. 31, 2017

(65) Prior Publication Data

US 2018/0139227 A1    May 17, 2018

Related U.S. Application Data

(60) Provisional application No. 62/415,227, filed on Oct. 31, 2016.

(51) Int. Cl.
*H04L 9/00* (2006.01)
*H04L 29/06* (2006.01)

(52) U.S. Cl.
CPC .............................. *H04L 63/1433* (2013.01)

(58) Field of Classification Search
CPC .................................................. H04L 63/1433
USPC ................................................................ 726/25
See application file for complete search history.

(56) References Cited

U.S. PATENT DOCUMENTS

| 7,359,930 | B2 * | 4/2008 | Jackson | ............. | H04L 41/0893 |
| | | | | | 709/200 |
| 8,245,295 | B2 * | 8/2012 | Park | ........................ | G06F 21/55 |
| | | | | | 713/176 |
| 9,178,908 | B2 * | 11/2015 | Call | .................... | H04L 63/0471 |
| 2017/0118237 | A1 * | 4/2017 | Devi Reddy | .......... | G06N 7/005 |

* cited by examiner

*Primary Examiner* — Christopher J Brown
(74) *Attorney, Agent, or Firm* — Lando & Anastasi, LLP

(57) ABSTRACT

One variation of a method for predicting security risks of assets on a computer network includes: over a first period of time, detecting an asset connected to the computer network and a first set of behaviors exhibited by the asset; associating the asset with a first set of assets based on similarity of the first set of behaviors to behaviors characteristic of the first set of assets; over a second period of time succeeding the first period of time, detecting the asset connected to the computer network and a second set of behaviors exhibited by the asset; detecting deviation of the asset from the first set of assets based on differences between the second set of behaviors and behaviors characteristic of the first set of assets; and generating a security alert for the asset in response to deviation of the asset from the first set of assets.

19 Claims, 4 Drawing Sheets

US 10,855,715 B2

METHOD FOR PREDICTING SECURITY RISKS OF ASSETS ON A COMPUTER NETWORK

CROSS-REFERENCE TO RELATED APPLICATIONS

This Application claims the benefit of U.S. Provisional Application No. 62/415,227, filed on Oct. 31, 2016, which is incorporated in its entirety by this reference.

TECHNICAL FIELD

This invention relates generally to the field of cyber security and more specifically to a new and useful method for predicting security risks of assets on a compute network in the field of cyber security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method—Asset Type

Figure 1:
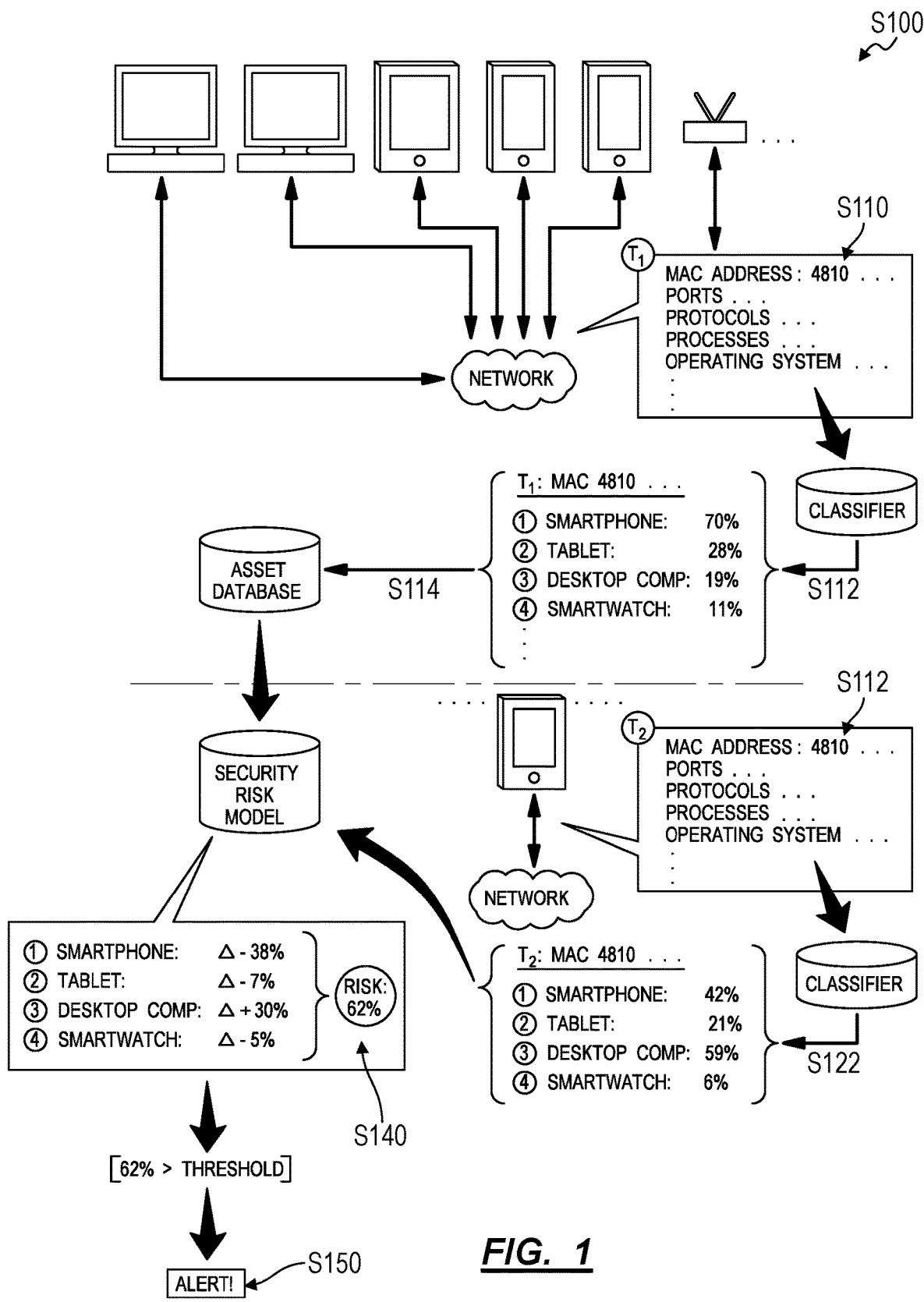
FIG. 1 is a flowchart representation of a method.

As shown in FIG. 1, a method S100 for predicting security risks of assets on a computer network includes: over a first period of time, discovering an asset connected to the computer network in Block Silo; associating a first set of behaviors detected on the computer network during the first period of time with the asset in Block S111; calculating a first similarity score representing similarity between the asset and a first asset type based on the first set of behaviors associated with the asset in Block S112; storing the first similarity score with an identifier of the asset in Block S114; over a second period of time succeeding the first period of time, identifying the asset connected to the computer network in Block S120; associating a second set of behaviors detected on the computer network during the second period of time with the asset in Block S121; calculating a second similarity score representing similarity between the asset and the first asset type based on the second set of behaviors associated with the asset in Block S122; and generating a security alert for the asset based on a difference between the first similarity score and the second similarity score in Block S150.

The method S100 can similarly include, over a first period of time, discovering an asset connected to the computer network in Block S110; associating a first set of behaviors detected on the computer network during the first period of time with the asset in Block S111; associating the asset with a first set of assets based on similarity of the first set of behaviors to behaviors characteristic of the first set of assets in Block S112; over a second period of time succeeding the first period of time, identifying the asset connected to the computer network in Block S120; associating a second set of behaviors detected on the computer network during the second period of time with the asset in Block S121; detecting deviation of the asset from the first set of assets based on differences between the second set of behaviors and behaviors characteristic of the first set of assets in Block S130; and generating a security alert for the asset in response to deviation of the asset from the first set of assets in Block S150.

The method S100 can similarly include, at a first time: discovering an asset connected to the computer network in Block S110; calculating a first confidence score that the asset represents a first asset type based on features representing the asset at approximately the first time in Block S112; and storing the first confidence score with an identifier of the asset in Block S114. The method S100 also includes, at a second time succeeding the first time: identifying the asset connected to the computer network based on the identifier of the asset in Block S120; and calculating a second confidence score that the asset represents the first asset type based on features representing the asset at approximately the second time in Block S122. Furthermore, the method S100 includes: calculating a security risk score of the asset based on a difference between the first confidence score and the second confidence score in Block S140; and in response to the security risk score exceeding a threshold risk score, generating a security alert for the asset in Block S150.

2. Applications

Generally, the method S100 can be executed by a computer system in conjunction with a computer network—such as an internal network within a company, corporation, agency, administration, or other organization—to identify an asset (e.g., a machine and a user) connected to the network and posing a security risk to the network based on changes in mutable characteristics (e.g., behaviors, processes) of the asset. In particular, an asset of a particular asset type (e.g., a laptop computer, a smartphone, a smart watch, a server, a print, a router, etc.) connected to the network may regularly execute a set of known behaviors common to its asset type when no security threat is present at the asset. However, upon infiltration into the asset, such as by malware, the asset may begin to execute behaviors uncommon to its asset type. As these behaviors of the asset deviate further from the behaviors common to the asset's asset type, risk to the network may increase; the computer system can therefore implement Blocks of the method S100 to track such deviation of the asset's behaviors, calculate a security risk of the asset as a function of this deviation, and issue an alert to security personnel to investigate the asset according to this security risk (e.g., when this security risk exceeds a threshold).

For example, the computer system can implement the method S100 to monitor unmanaged assets connected to the network, such as smartphones, tablets, smart watches, etc. of employees and smartphones, tablets, smart watches, laptop computers, etc. of guests on the network. Because these assets are unmanaged, their asset types, security patch states, system updates, etc. may be uncontrolled, not directly known, and/or not directly accessible to the computer system. The computer system can therefore implement Blocks of the method S100 to predict an asset type of an unmanaged asset connected to the network based on similarities between behaviors of this asset and common behaviors of a known asset type. However, a change in the predicted asset type of the asset over time may suggest that the asset is performing behaviors uncommon to its asset type, and the computer system can flag this asset as potentially posing a security threat. The computer system can therefore implement Blocks of the method S100 to flag assets exhibiting behaviors not common to asset types with which these assets were previously associated, even if the types and other immutable characteristics of these assets are not known by the computer system.

Similarly, new unmanaged assets and asset types may connect to the network over time as manufacturers produce new devices and device models and as employees and guests connect these new devices to the network. Models for these new assets and asset types may therefore be unavailable, and these assets and asset types may be unknown to the computer system. However, the computer system can implement the method S100 to: identify groups (or "clusters") of assets exhibiting similar behaviors; and then flag a particular asset if this particular asset has moved away from a cluster of assets with which the particular asset has been grouped for an extended duration (e.g., the past two weeks). The computer system can therefore implement Blocks of the method S100 to flag a particular asset exhibiting behaviors that deviate from behaviors of other assets with which the particular asset was previously grouped, even if the type and other immutable characteristics of these assets are not known by the computer system.

In one implementation, the computer system can: detect assets connected to the network and behaviors of these assets while connected to the network; associate behaviors with assets at which these behaviors originated; calculate a similarity score quantifying similarities between behaviors originating at a particular asset over a period of time and behaviors common to a known asset type; and regularly recalculate this similarity score as additional behaviors originating at the particular asset are detected. Upon detecting a substantive change in the similarity score between the particular asset and a (most similar) asset type, the computer system can flag the particular asset as a possible risk to the network. For example, the computer system can: calculate a risk that the asset represents a security threat to the network, such as based on a magnitude and/or rate of change in the similarity score of the particular asset for the asset type over time; and then generate an alert, prompt an investigation into the asset by a security analyst, or automatically removing the asset from the network if the security risk score for the particular asset exceeds a threshold score. The computer system can track a specific asset connected to the network over time, such as based on a MAC address of the asset, and predict a change in the security risk of the specific asset based on changes in its asset type similarity score over time.

Alternatively, the computer system can: aggregate mutable characteristics (e.g., behaviors) of many (e.g., thousands of) assets connected to a network over time; identify clusters of like assets (e.g., assets predicted to be of the same asset type) based on similarities between their behaviors; and identify specific assets representing increased security risk to the network as these assets begin to exhibit behaviors that deviate from behaviors of other assets in their previous asset clusters.

By implementing the method S100 to track individual assets and/or clusters of like assets on the network and detect changes in asset type similarity scores and asset clusters for individual assets over time, the computer system can identify specific assets that may pose security threats to the network substantially in real-time and without necessitating: manual labeling of asset types of new assets joining the network; manual definition of new asset types that may join the network; or manual labeling of groups of like assets; etc. by security personnel. Similarly, by implementing Blocks of the method S100 to characterize a new asset connecting to the network and tracking changes in this new asset's behaviors relative to a nearest known asset type or relative to other like assets on the network, the computer system can also inherently flag new assets that may pose a risk to the network—with low rates of Type I and Type II errors—without additional human supervision.

3. Examples

Under normal conditions in which an asset on the network poses limited security risk to the network, a similarity score quantifying similarity between behaviors of the asset and behaviors of a particular asset type may remain substantially constant (e.g., may vary by less than +/−2.5%); however, the asset type similarity score may shift significantly when the asset executes uncommon behaviors (e.g., processes or protocols), which may be indicative of an increased risk of a cyber attack perpetrated on the network through the asset. In particular, a change in processes and/or protocols executed by an asset during an attack or network exploitation attempt may yield a change in asset type similarity score for the asset, as the behaviors of the asset begin to deviate from the nearest asset type previously associated with the asset. For example, an asset (e.g., a desktop work computer, a server) may exhibit: unusual outbound network traffic; anomalies in privileged user account activity; geographical irregularities; login red flags (e.g., failed logins using non-existent user accounts); swells in database read volume; abnormally large HTML response sizes; large numbers of requests for the same file; mismatched port-application traffic; suspicious registry or system file changes; DNS request anomalies; unexpected patching of systems; mobile device profile changes; web traffic with unhuman behavior; etc. during an attack or network exploitation attempt. The asset may thus execute processes and protocols not common to its asset type as the asset attempts to exploit the network, since these processes and protocols may be more representative of a different asset type.

The computer system can regularly pass frequencies of processes and protocols executed by the asset into a classifier to calculate similarity scores for the asset and various known asset types. As the asset executes processes and protocols to the primary asset type for which a greatest similarity score was previous calculated for the asset, the classifier may output diminishing similarity scores for the asset and the primary asset type. The computer system can interpret this diminishing similarity score for the asset and the primary asset type (and an increasing similarity score for the asset and another asset type) with increasing probability that the asset poses a security risk to the network. The computer system can then automatically remove the asset from the network or prompt human security personnel (e.g., a security analyst) to investigate the asset, such as if the change in the similarity score between the asset and the primary asset class exceeds a threshold change magnitude or a threshold change rate.

In one example, the computer system can regularly pass frequencies of behaviors—executed by an asset connected to the network—through the classifier, which can regularly output: a similarity score between 70% and 73% for the asset and a first asset type (e.g., a smartphone); and a similarity score between 22% and 26% for a second asset type (e.g., a tablet) while the asset is connected to the network. The computer system can label the asset as low risk in light of such regular similarities (e.g., +/−5%). between the asset and the first and second asset types. However, when the asset connects to the network at a later time and executes a different combination of behaviors detected by the computer system, the classifier can output: a similarity score of 40% for the asset and the first asset type; and with a similarity score of 49%, for the asset and a third asset type (e.g., a communication server), such as if the asset executes attempts to remotely access another asset on the network, which are uncommon to the first asset type but more common to the third asset type. The computer system can then correlate these changes in similarity scores for the asset as an increased possibility that the asset poses a security risk to the network.

In a similar example, the computer system can pass frequencies of behaviors of an asset into the classifier over time, and the classifier can output: a similarity score of 80% for the asset and a database server asset type; and a similarity score of 10% for the asset and an infrastructure server asset type. If, at a later date, the classifier outputs a similarity score of 20% for the asset and a database server asset type and a similarity score of 70% for the asset and an infrastructure server asset type, the computer system can again flag the asset as posing a possible a security risk to the network and prompt a security analyst to investigate the asset accordingly.

The computer system can therefore: associate a low security risk to an asset that consistently exhibits behaviors similar to those of a particular asset type; and associate a higher security risk to the asset as the asset executes behaviors that deviate from this particular asset type over time.

4. Asset Discovery

As shown in FIG. 1, Block 110 of the method S100 recites, at a first time, discovering an asset (or a set of assets) connected to the computer network. Generally, in Block S110, the computer system identifies assets—such as represented by a machine and a user logged into the machine—currently connected or connecting to the network.

In one implementation, when a machine accesses the network, the computer system queries the machine for its media access control (or "MAC") address, queries an account log on the machine or on the network for a user account logged in at the machine, and tracks the machine and the user (i.e., "the asset" based on the MAC address and user account data returned by the asset. Therefore, in Block 110, the computer system can: detect an identifier of a machine connected to the computer network; detect a user account accessed by the machine; and define the asset according to the identifier of the machine and the user account. The computer system can additionally or alternatively track the asset by its internet protocol (or "IP") address (e.g., an IPv4 or IPv6 address). For example, the computer system can track the asset by its static local IP address. Alternatively, the computer system can access the asset's external (i.e., public) IP address, scan IP logs on the network to identify the asset's local IP address, and track the asset by its external IP address.

However, the computer system can detect and identify an asset in any other way in Block S110. The computer system can implement these methods and techniques to track a set (e.g., hundreds, thousands) of assets connected to the network at any given time. Block S120 of the method S100 recites, over a second period of time succeeding the first period of time, identifying the asset connected to the computer network. Generally, in Block S120, the computer system can implement similar methods and techniques to detect and track behaviors of the asset while connected to the network.

5. Behaviors

Block S111 of the method S100 recites associating a first set of behaviors detected on the computer network during the first period of time with the asset. Generally, in Block S111, the computer system can detect various behaviors occurring on the network over a period of time, identify a subset of these behaviors performed by (or originating with, occurring at) the asset, and generate a representation of this subset of behaviors performed by the asset in preparation for comparison with behaviors of other assets on the network or with exiting asset models.

Block S121 of the method S100 recites associating a second set of behaviors detected on the computer network during the second period of time with the asset. Generally, in Block S121, the computer system can implement similar methods and techniques to link behaviors occurring on the network to their corresponding assets.

6.1 Behavior Detection

In one implementation, the computer system: interfaces with a sensor implementing deep packet inspection to detect behaviors of assets connected to the network; accesses an identifier of the asset performing each behavior detected by the sensor; and maintains a log of new events and corresponding asset identifiers. For example, the sensor can implement deep packet inspection to analyze inbound, outbound, and intra-network traffic and to output a variety of signals specifying detected behaviors of interest or predefined combinations of behaviors of interest by assets on the network, such as: account access attempts by an asset on the network; connections between the asset and a domain outside of the network; receipt of an email attachment; access to a file from another asset on the network; access to an external domain; a network access time; a login attempt by the asset; and/or errors; etc., combinations of which may be performed by various assets connecting to the network over time. The sensor can output these signals and identifiers of their corresponding assets to a signal feed, such as to a perpetual signal accounting log or to a rolling (e.g., circular) signal accounting log spanning a limited time window (e.g., two weeks).

The computer system can additionally or alternatively monitor a network accounting log and link network events indicated in the network accounting log to particular assets connected to the network, such as based on MAC addresses, IP addresses, IP logs, and/or user account logs, etc. in Block S111. For example, the network accounting log can store: connection frequency; ports queried on other assets on the network; executed protocols; executed processes; upload and download rates; upload and download packet size; types or locations of other soft assets accessed by an asset on the network; etc. For example, the computer system can: detect unmanaged assets connecting to an internal computer network over a period of time in Block S110; extract computer network requests and network traffic—originating at these unmanaged assets connected to the internal computer network during this period of time—from a network accounting log in Block S111; and link these computer network requests and network traffic events to corresponding assets in Block S111.

However, the computer system can detect behaviors of assets on the network and associate each behavior with a particular asset in any other way in Block S111.

6.2 Data Structures

In Block S111, the computer system can then aggregate signals associated with a particular asset into a single data structure representing frequencies of each behavior type, in the predefined set of behavior types, executed by the asset over a period of time of time.

Figure 3:
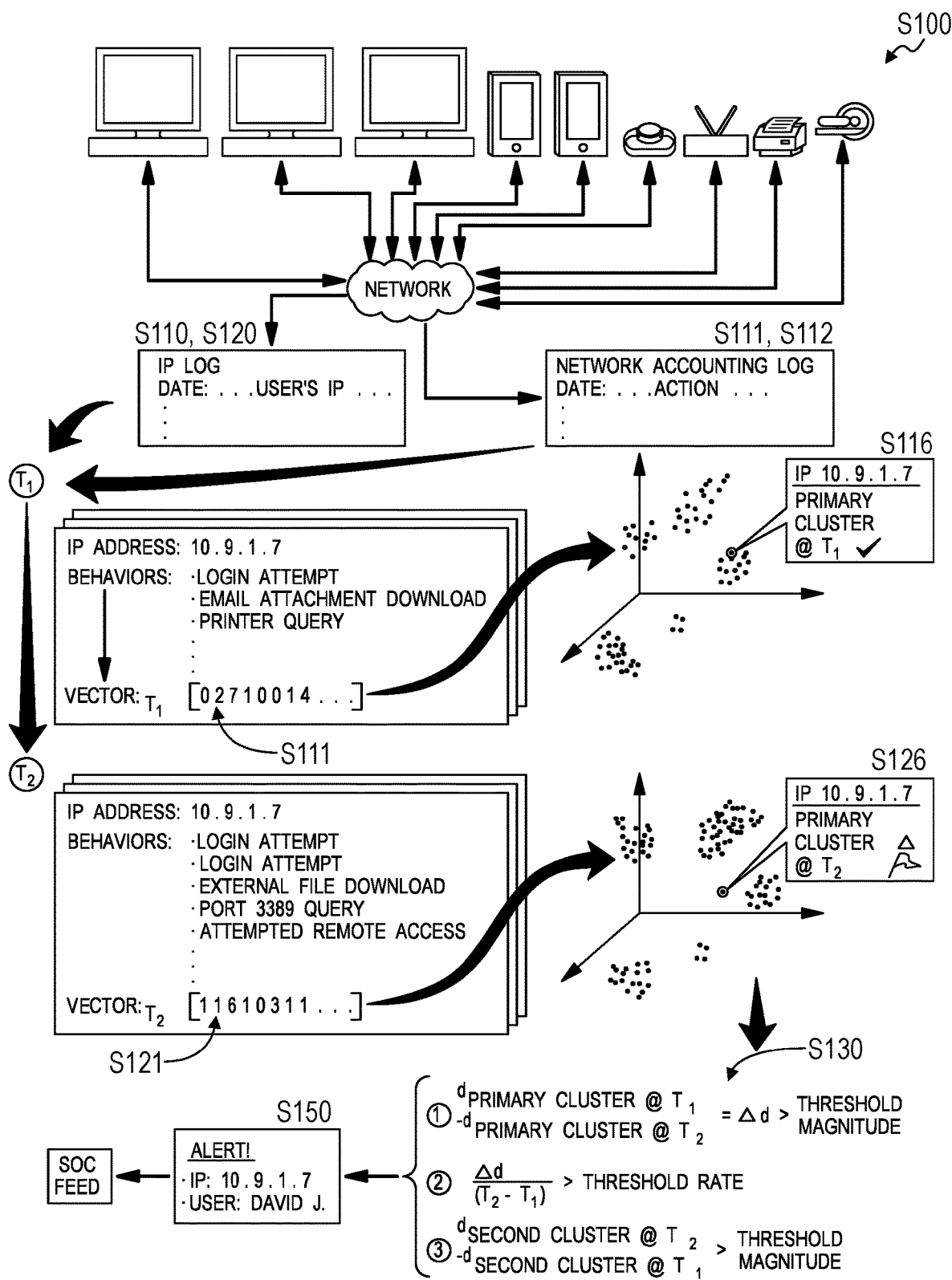
FIG. 3 is a flowchart representation of one variation of the method.

In one implementation, the computer system transforms a set of behaviors—recorded over a period of time and associated with a particular asset—into a multi-dimensional vector that represents frequencies of each behavior type, in the predefined set of behavior types, executed by the asset during this period of time. For example, the computer system can generate a multi-dimensional vector containing n ordered elements, wherein element i in the vector corresponds to unique behavior or a unique combination of behaviors i in n-number of monitored behavior types (i.e., behavior types maintained by network accounting logs monitored by sensors on the network), as shown in FIG. 3. In this example, for each asset on the network (e.g., for each unique combination of one user and one machine on the network), the system can generate a unique vector representing frequencies of behaviors of each behavior type—in the predefined set of n behavior types—occurring at or involving the asset within a time window of preset duration (e.g., five minutes, one hour, one day, two weeks). Thus, for a network hosting m-number of assets with one unique user logging in to each asset over a period of two weeks, the system can generate (and update or regenerate) up to m-number of unique vectors representing frequencies of behaviors of each behavior type of each of m-number of assets within this time interval.

In one implementation, the system generates (or regenerates, updates) a first vector corresponding to a first asset on the network in response to entry of a new signal—specifying the first asset—into the signal feed. In this implementation, the system can: generate (or clear) a first vector containing n null elements; filter the signal feed to most-recent signals generated within the preset window of time; aggregate this subset of signals specifying the first asset; and increment each element in the first vector for each instance of a corresponding behavior type detected in this subset of signals. Alternatively, the system can regularly generate (or regenerate, update) the first vector, such as once per minute or hour that the asset is connected to the network, or upon detecting a threshold number of (e.g., four) behaviors associated with the first asset.

In another implementation, upon entry of a new behavior—associated with the first asset—into the signal feed (or after a preset time interval or upon receipt of a threshold number of signals specifying the first asset), the system can: extract a first behavior type from the new signal; retrieve the first vector; increment a first element in the first vector corresponding to the first behavior type; detect an old signal in the signal feed associated with the first asset and older than the preset duration (e.g., two weeks); extract a second behavior type from the old signal; and decrement a second element in the first vector corresponding to the second behavior type.

However, the system can generate, update, and/or maintain a vector for each asset on the network over time in any other way and in response to any other event or timer in Block Sm. Furthermore, while described hereinafter as a vector, the system can store asset behavior data in any other data structure, such as in a 1×n array or in a multi-dimensional matrix, etc., in which elements in the data structure correspond to a preset order or schema of behavior types for which sensors, network accounting logs, and other detection mechanisms on the network are configured to output signals.

7. Asset Typing and First Similarity Score

As shown in FIG. 1, Block S112 of the method S100 recites, calculating a first similarity score representing similarity between the asset and a first asset type based on the first set of behaviors detected over a first period of time and associated with the asset; and Block S114 of the method S100 recites storing the first similarity score with an identifier of the asset. Generally, in Block S112, the computer system calculates a first similarity score quantifying (or qualifying) a similarity between a first set of behaviors performed by the asset over a first period of time—such as stored in a first multi-dimensional vector associated with the asset—and behaviors of a particular known asset type. (The computer system can alternatively transform a set of behaviors performed by the asset over a period of time into a confidence score that the asset is of a known asset type.) In Block S114, the computer system stores the asset type similarity score with an identifier of the asset, such as the asset's local IP address, for later comparison to a subsequent asset type similarity score calculated in Block S122.

The computer system can also implement methods and techniques described herein to calculate similarity (or confidence) scores for the asset and each of many known asset types in Block S112 based on various behaviors performed by the asset during a period of time. In Block S114, the computer system can store all or a subset of these similarity scores for the asset for subsequent processing in Blocks S140 and S150.

7.1 Classifier

In one implementation, the computer system implements a classifier configured to output a confidence score that the asset represents a particular asset type based on the set of behaviors collected in Block S110. For example, the classifier can include a multi-level neural network, decision tree, topic model, support vector machine, or other non-negative matrix factorization method or algorithm configured to output a confidence score between 0% and 100% that the asset is one of a: mainframe computer; server; switch; desktop or notebook computer; smartphone; smart watch; tablet; IoT device; printer; wired phone; wireless-enabled light bulb; modem; firewall; or wireless router.

The classifier can also output a set of confidence scores for the asset, wherein each confidence score in the set represents a confidence that the asset is of a unique asset type. For example, the classifier can return a set of confidence scores for each known (e.g., previously characterized) asset type in all known asset types. Alternatively, the classifier can return confidence scores for all known asset types for which a calculated confidence score exceeds a threshold confidence score (e.g., 10%). For example, upon receipt of a set of behaviors performed by the asset over a period of time, the classifier can output a set of confidence scores describing the asset, including: 70% smartphone; 28% tablet; 19% desktop computer; and 11% smartwatch. In another example, the classifier can output a set of confidence scores describing the asset, including: 80% database server; 28% file server; 21% domain server; and 10% communications server.

The classifier can also output a confidence score for an asset type and asset subclass, such as manufacturer, operating system, operating system updates, owner or assignee type (e.g., employee, manager, security personnel), etc. For example, upon receipt of a set of behaviors related to the asset, the classifier can output a set of confidence scores describing the asset, including: 71% smartphone by a first manufacturer and executing a first operating system; 39% smartphone by the first manufacturer and executing a second operating system; 22% smartphone by a second manufacturer and executing a third operating system; and 15% tablet by the first manufacturer.

7.2 Asset Type Models

In another implementation, the computer system accesses a set of predefined asset models, such as one asset model for each of: mainframe computer; server; switch; desktop or notebook computer; smartphone; smart watch; tablet; IoT device; printer; wired phone; wireless-enabled light bulb; modem; firewall; or wireless router. In this implementation, each asset model can specify: types of behaviors; maximum, minimum, and/or average frequencies of behaviors; excluded behaviors; etc. common to assets of its corresponding asset type. For example, each asset model can include a model vector indicating types and quantities of each behavior—in the predefined set of behaviors described above—performed by a representative asset of the asset type within a particular duration of time. The computer system can then: calculate a distance from the first vector—generated, as described above, from a set of behaviors performed by the asset within the first period of time—to a model vector representing a particular asset type; store this distance as a similarity score for similarity between the asset and this asset type; and repeat this process to calculate similarity scores for the asset and other known asset types. Therefore, in Block S112, the computer system can calculate a similarity score—quantifying similarity between the asset and a first asset type during a first period of time—proportional to a distance from a first vector representing the asset's behaviors during this first period of time to a first model vector representing this first asset type.

(In the foregoing example, an asset model can also dynamically output a model vector representative of assets of the asset type based on time of day (e.g., work hours versus off hours), day of the week (e.g., weekday or weekend), user account type (e.g., employee, administrator, or guest), etc., such as over a static or variable duration of time.)

In the foregoing implementations, the computer system can also access and implement updated asset models in order to compensate for changes in operation and functionality of asset types over time. For example, the computer system can implement methods and techniques described below to: identify clusters of assets exhibiting like types and frequencies of behaviors on the network within a period of time; compile types and frequencies of behaviors of a cluster of assets into a single representative asset model; implement this asset model in Block S112 to determine an asset's similarity to other assets in this cluster over a similar period of time; and regularly update these asset models as new behaviors occur on the network (e.g., once per day).

However, the computer system can implement any other method or technique to associate the asset with one or more asset types and to calculate a confidence score for the accuracy of these asset type associations based on asset behaviors collected at a first time or over a first time period (e.g., over a ten-second scan period).

7.3 Second Similarity Score

Block S122 of the method S100 recites calculating a second similarity score representing similarity between the asset and the first asset type based on the second set of behaviors associated with the asset. Generally, in Block S122, the computer system can implement methods and techniques described above to calculate a second similarity score quantifying a similarity between a second set of behaviors performed by the asset over a second period of time—such as stored in a second multi-dimensional vector associated with the asset—and behaviors of a particular known asset type. The computer system can execute these methods and techniques (i.e., Blocks S111 and S112 followed by Blocks S121 and S122) regularly over time, such as once per hour, minute, or second that the asset is connected to the network. The computer system can additionally or alternatively execute these methods or techniques each time the asset connects to the network or according to any other schedule or in response to any other network event.

8. Security Risk

As shown in FIG. 1, Block S140 of the method S100 recites calculating a security risk score for the asset as a function of the difference between the first similarity score and the second similarity score. (Block S140 can similarly recite calculating a security risk score of the asset based on a difference between the first confidence score and the second confidence score.) Generally, in Block S140, the computer system transforms a difference between asset type similarity scores calculated for the asset over time (e.g., at the first time in Block S112 and at the second time in Block S122) into a probability that the asset represents a threat to the network.

In particular, the asset type of an asset may be immutable; while its behaviors may vary over time, such variance should be relatively minimal and should remain generally characteristic of the same asset type over time. For example, a smartphone will remain a smartphone over time. While the asset class of the smartphone may not be explicitly known or detectable by the computer system, the computer system may predict that the asset is a smartphone given strong similarity between types and frequencies of behaviors performed (and not performed) by the smartphone over time and an existing model of a smartphone (or an existing model of a smartphone produced by a particular manufacturer and executing a particular operating system). However, when behaviors by the smartphone begin to deviate from this existing model of a smartphone, this smartphone may be performing processes abnormal to its smartphone class and may therefore pose a risk to the network. The computer system can therefore execute the method S100 to detect the smartphone's behavioral changes in Block S140 and to flag the smartphone as a possible risk to the network in Block S150 described below.

8.1 Magnitude Change in Similarity Score

In one implementation shown in FIG. 1, the computer system transforms a magnitude change in the similarity score between the asset and a particular asset type from a first time to a second time into a risk score—on a spectrum of risk scores—that the asset represents a threat to the network. For example, the computer system can: calculate a first similarity score of 75% for the asset and the primary asset type (i.e., exhibiting a greatest similarity to the asset) for a first period of time in Block S112; calculate a second similarity score of 72% for the asset and this same asset type for a second period of time in Block S122; and interpret this change from 75% to 72% similarity score for this asset type as a risk score of less than 2% in Block S140. Later, the computer system can: calculate a third similarity score of 69% for the asset and this same asset type for a third period of time; and interpret this change from 75% to 69% similarity score for this asset type as a risk score of 10%. Even later, the computer system can: calculate a fourth similarity score of 40% for the asset and this same asset type for a fourth period of time; and interpret this change from 75% to 40% similarity score for this asset type as a risk score of 40%. Therefore, in this example, the computer system can calculate a risk score for the asset proportional to a magnitude of deviation of similarity scores representing similarity between the asset and a particular asset type over time.

The computer system can alternatively transform a magnitude change in the similarity score for the asset and a particular asset type into a qualitative risk score, such as: "low risk" for a change of less than 5% in similarity score for the asset and the particular asset type; "moderate risk" for a change between 5% and 20% in similarity score for the asset and the particular asset type; and "high risk" for a change greater than 20% in similarity score for the asset and the particular asset type. However, the computer system can transform a magnitude change in similarity scores for the asset and a particular asset type into a risk score for the asset in any other way or according to any other schema.

8.2 Multiple Asset Type Similarity Scores

The computer system can implement similar methods and techniques to calculate a risk score for the asset based on changes in similarity scores for the asset and multiple asset types.

In one example, the computer system can: transform a first set of behaviors—recorded during a first period of time and associated with the asset into a first multi-dimensional vector representing frequencies of each behavior type—in the predefined set of behavior types described above—executed by the asset during the first period of time in Block S111; calculate a first similarity score proportional to a distance from the first vector to a first model vector representing a first asset type (e.g., a smartphone asset type) in Block S112; and calculate a third similarity score proportional to a distance from the first vector to a second model vector representing a second asset type (e.g., a server) in Block S112. Later, the computer system can: transform a second set of behaviors—recorded during a second period of time succeeding the first period of time and associated with the asset—into a second multi-dimensional vector representing frequencies of each behavior type, in the predefined set of behavior types described above, executed by the asset during the second period of time in Block S121; calculate a second similarity score proportional to a distance from the second vector to the first model vector in Block S122; and then calculate a fourth similarity score proportional to a distance from the second vector to the second model vector in Block S122. The computer system can then correlate a difference between the first similarity score and the second similarity score and a difference between the third similarity score and the fourth similarity score with a risk of the asset to the network. In particular, the computer system can flag the asset as risky in Block S140 and generate a security alert for the asset in Block S150 based on differences between the first and second similarity scores and differences between the third and fourth similarity scores. For example, the computer system can flag the asset if the asset transitions from exhibiting behaviors strongly characteristic of a smartphone and minimally characteristic of a server to exhibiting behaviors strongly characteristic of a server and only moderately characteristic of a smartphone (i.e., if the first similarity score exceeds the third similarity score but the fourth similarity score then exceeds the third similarity score).

The computer system can implement similar methods and techniques to merge changes in similarity scores between the asset and multiple (e.g., all known) asset types.

8.3 Rate of Change

In another implementation, the computer system: calculates a rate of change in similarity score for the asset and a particular asset type (e.g., the asset's primary asset type) over a period of time; and transforms this rate of change into a risk score for the asset. For example, the rate at which a similarity between the asset and another asset type changes may indicate a rate at which anomalous—and therefore risky—processes and protocols are executed by the asset.

In this implementation, the computer system can: calculate a first similarity score representing similarity between the asset and a primary asset type in Block S112 based on a first set of behaviors performed by the asset during a first period of time; calculate a second similarity score representing similarity between the asset and the primary asset type in Block S122 based on a second set of behaviors performed by the asset during a second period of time; calculate a deviation rate of the asset from the primary asset type based on the first similarity score, the second similarity score, and a time between the first period of time and the second period of time; and then calculate a security risk score for the asset as a function of the deviation rate in Block S140.

The computer system can therefore calculate a risk that the asset represents a security threat to the network as a function of the rate at which similarity scores for the asset and one or more asset types change.

8.4 Normalization

The computer system can also normalize or calibrate a risk score associated with the asset based on one or more asset types associated with the asset. For example, the computer system can multiply the risk score of the asset by a preset scalar value (e.g., between 0.5 and 1.5) assigned to the primary asset type associated with the asset. Alternatively, the computer system can implement an asset-class-specific model—described above—for transforming a change in similarity score of the asset into a risk score.

However, the computer system can implement any other method or technique to transform a change in similarity score of an asset into a risk score representing probability that the asset represents a risk to the network.

9. Clustering by Similarity Score

Figure 2:
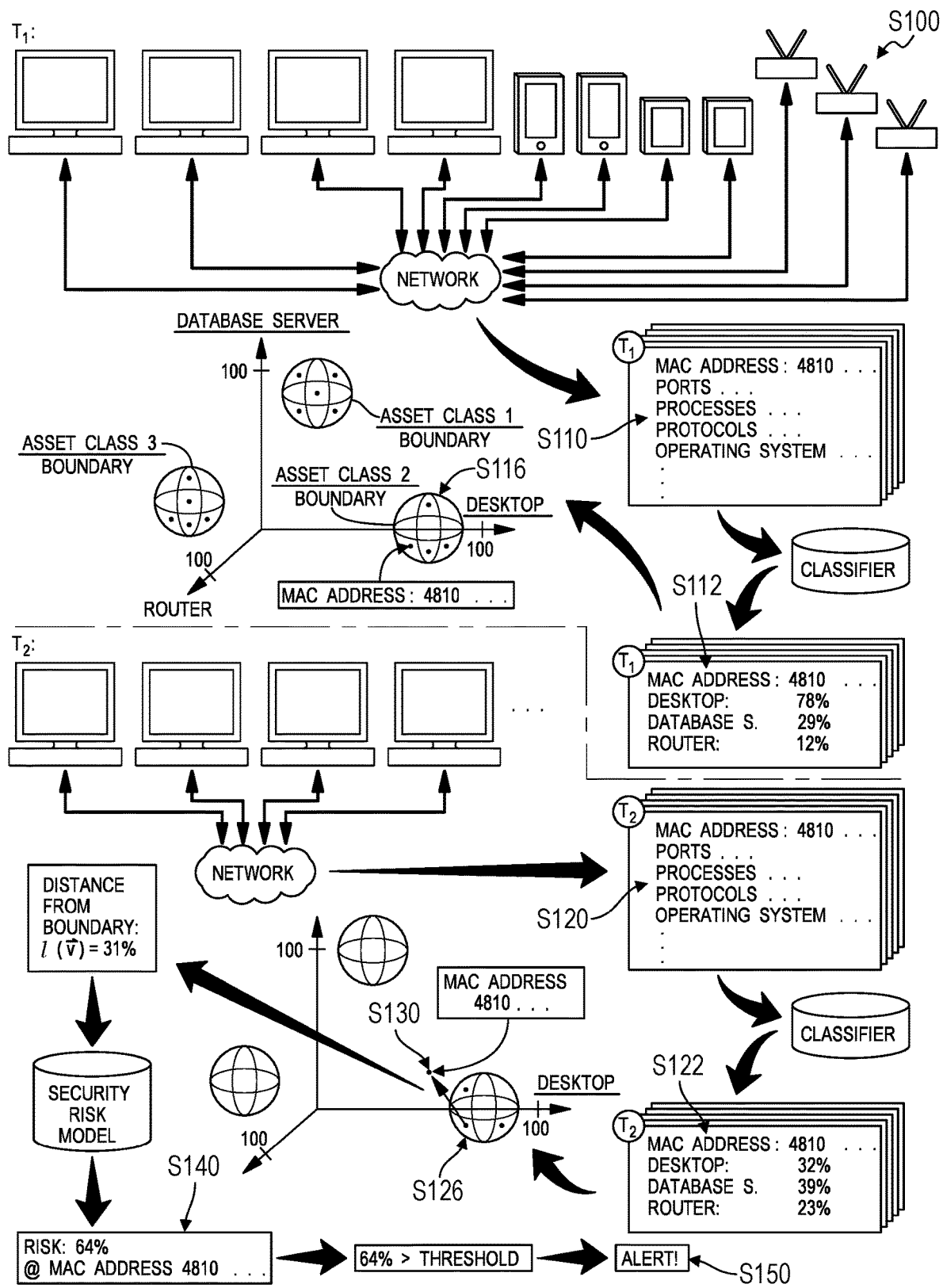
FIG. 2 is a flowchart representation of one variation of the method.

In one variation shown in FIG. 2, the method S100 can include, at a first time: discovering a first set of assets connected to the computer network in Block Silo; calculating a first set of confidence scores that assets in the first set of assets represent known asset types based on features of the first set of assets at approximately the first time in Block S112; and identifying a first cluster of like assets, within the first set of assets, associated with similar confidence scores, in the first set of confidence scores, for a first asset type in Block S116. In the variation, the method S100 also includes, at a second time succeeding the first time: discovering a second set of assets connected to the computer network in Block S120; calculating a second set of confidence scores that assets in the second set of assets represent known asset types based on features of the second set of assets at approximately the second time in Block S122; and identifying a second cluster of like assets, within the second set of assets, associated with similar confidence scores, in the second set of confidence scores, for the first asset type in Block S126. Furthermore, in the variation, the method S100 includes: selecting a particular asset corresponding to a difference between the first cluster of like assets and the second cluster of like assets in Block S130; calculating a security risk score of the particular asset based on a magnitude of the difference between the first cluster of like assets and the second cluster of like assets in Block S140; and in response to the security risk score exceeding a threshold risk score, generating a security alert for the particular asset in Block S150.

9.1 Applications

In this variation, the computer system implements methods and techniques described above to: collect behaviors representing each of multiple assets connected to the network; pass behaviors of each asset into the classifier to generate one or more asset type similarity scores for each asset; identify clusters (or "groups," "cohorts") of assets associated with similar confidence scores for one or more asset types; and label an asset as risky if the asset shifts away from its cohort of like assets (e.g., rather than track each asset individually by unique asset identifier).

In this variation, the classifier outputs confidence scores for multiple asset types for each asset connected to the network in Block S112, and the computer system populates a virtual multi-dimensional map (hereinafter an "asset map," such as including one dimension per asset type represented) with a set of points representing each asset based on asset type similarity scores associated with these assets. In particular, the computing device can locate a point representing a particular asset in the asset map based on a confidence score for each asset type associated with the particular asset. The computer system then implements clustering techniques, such as K-means clustering, nearest neighbor, latent Dirichlet allocation, and/or nonlinear kernels supplied to linear methods, etc. to identify distinct cohorts of near points within the asset map. In this implementation, each distinct cohort of points can thus represent similar assets (i.e., assets associated with similar combinations of asset types according to similar confidence scores) connected to the network. The computer system can repeat this process for each scan period to generate one asset map representing types of assets connected to the network per scan period. The computer system can then compare cohorts of points across a sequence of asset maps to identify a positional change of a particular point—representing a particular asset on the network—that may indicate a change in processes and protocols executed by the particular asset and therefore an increased risk that the particular asset represents a possible security threat to the network.

9.2 Centroid-To-Point Distance

In one implementation, the computer system calculates a centroid of a cohort of points within the asset map and calculates distances between the centroid and each point in the cohort for each asset map. The computer system then: implements methods and techniques described above to track a point—representing a singular asset—across two consecutive asset maps; calculates a change in the distance between the point and a centroid of the point's cohort between the two consecutive asset maps; and transforms this change in distance into a risk score for the asset.

9.3 Cohort Boundary

In another implementation shown in FIG. 2, for each asset map, the computer system defines a virtual boundary encompassing unique points (representing unique assets on the network) within a cohort (representing a group of like assets). The computer system then: implements methods and techniques described above to track a point—representing a singular asset—across two consecutive asset maps; and identifies instances in which the point transitions beyond the boundary defined for its cohort in the current or previous asset map. Upon determining that a particular point has moved beyond the boundary of its cohort, the computer system can associate a corresponding asset with an increased qualitative risk score (e.g., "risky"). Alternatively, the computer system can calculate a shortest distance from the particular point to the boundary of its cohort and then implement methods and techniques described above to transform this distance into a quantitative risk score (e.g., a value on a spectrum from "1" to "100") for the corresponding asset.

In this implementation, the computer system can: calculate a reference distance for the cohort, such as based on an area or volume contained within the boundary; then divide a distance that a particular point has moved beyond the boundary of its cohort (a "transition distance") by the reference difference to calculate a "normalized transition distance"; and then calculate a risk score for the corresponding asset as a function of the length of the normalized transition distance. The computer system can thus normalize or calibrate a distance that a point—representing an asset on the network—has moved beyond the boundary of its cohort within the asset map based on a size of the cohort or distribution of points within the cohort.

In the foregoing implementation, the computer system can implement a static, predefined boundary representing an asset type within the asset map. Alternatively, the computer system can recalculate a boundary of a cohort of points—likely representing a single asset type—over time. For example, positions of points within a sequence of asset maps may change (or "drift") over time, such as with software updates, organization-mandated installation of various software packages, or use changes occurring at corresponding assets over time. The computer system can accommodate for this drift by recalculating the boundary of a cohort of assets over time, such as once per week or once per day and then inserting a current boundary for an asset type or point cohort into each new asset map. Alternatively, the computer system can calculate a new boundary for a cohort of points for each asset map generated in each subsequent scan period and then implement methods and techniques described above to calculate a risk score for an asset corresponding to a point once the point has moved outside of the boundary of its cohort.

However, the computer system can implement any other method or technique to track like assets on the network over time and to correlate deviation of a particular asset—from its historical cohort of like assets—with an increased risk that the particular asset represents a risk to the network.

10. Method Variation—Clustering by Behavior Sets

Figure 4:
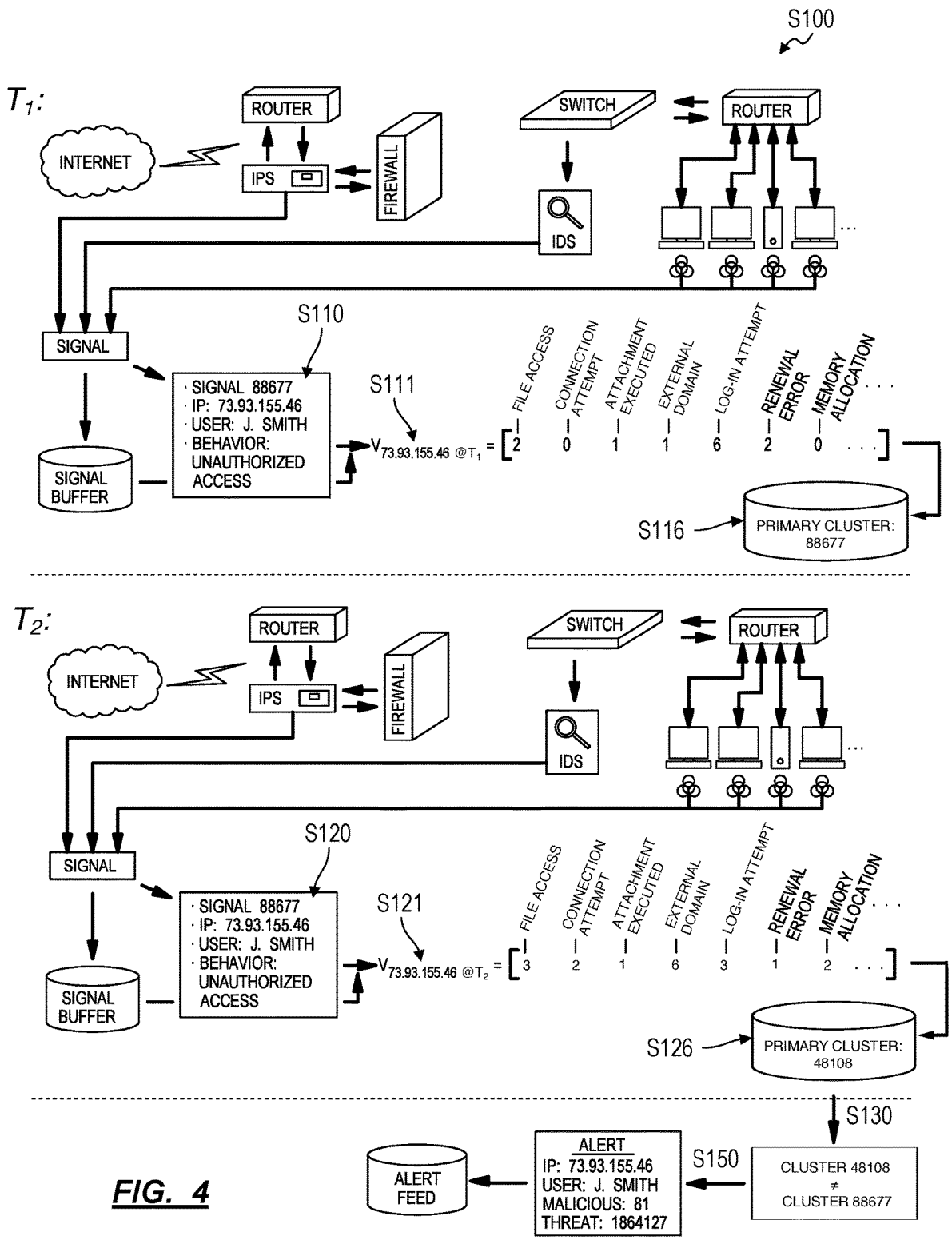
FIG. 4 is a flowchart representation of one variation of the method.

As shown in FIG. 4, one variation of the method S100 includes: over a first period of time, detecting a first set of assets connected to the computer network in Block S110 and detecting a first set of behaviors by the first set of assets connected to the computer network in Block S111; partitioning the first set of assets into a first instance of a first cluster of assets and a first instance of a second cluster of assets in Block S116, wherein assets in the first instance of the first cluster of assets exhibit similar behaviors during the first period of time, and wherein assets in the first instance of the second cluster of assets exhibit similar behaviors during the first period of time; over a second period of time succeeding the first period of time, detecting a second set of assets connected to the computer network in Block S120 and detecting a second set of behaviors by the second set of assets connected to the computer network in Block S121; partitioning the second set of assets into a second instance of the first cluster of assets and a second instance of the second cluster of assets in Block S126, wherein assets in the second instance of the first cluster of assets exhibit similar behaviors during the second period of time, and wherein assets in the second instance of the second cluster of assets exhibit similar behaviors during the second period of time; identifying a particular asset that shifted from proximal the first instance of the first cluster toward the second instance of the second cluster from the first period of time to the second period of time in Block S130; and generating a security alert to investigate the particular asset in Block S150.

As shown in FIG. 3, this variation of the method S100 can similarly include: over a first period of time, detecting an asset connected to the computer network in Block S110 and detecting a first set of behaviors exhibited by the asset connected to computer network during the first period of time in Block S111; associating the asset with a first set of assets based on similarity of the first set of behaviors to behaviors characteristic of the first set of assets in Block S116; over a second period of time succeeding the first period of time, detecting the asset connected to the computer network in Block S120 and detecting a second set of behaviors exhibited by the asset connected to the computer network during the second period of time in Block S121; detecting deviation of the asset from the first set of assets based on differences between the second set of behaviors and behaviors characteristic of the first set of assets in Block S130; and generating a security alert for the asset in response to deviation of the asset from the first set of assets in Block S150.

10.1 Applications

In this variation, the computer system: identifies clusters of assets exhibiting similar types and/or frequencies of behaviors in Blocks S116 and S126; identifies a particular asset exhibiting behaviors that have shifted away from behaviors of assets that previously exhibited (strong) behavioral similarity with the particular asset (and exhibiting behaviors that have shown increasing alignment with behaviors of assets that previously exhibited less behavioral similarity with the particular asset) in Block S130; and flags the particular asset as exhibiting a greater probability of risk to the network. In particular, in this variation, the computer system can implement methods and techniques similar to those described above to detect behaviors of multiple assets connected to the network and to store these behaviors in a data structure (e.g., a multi-dimensional vector) for each asset, such as shown in FIG. 4. The computer system can then compare data structures of these various assets to identify clusters (or "groups," "cohorts") of assets exhibiting similar types and frequencies of behaviors and maintain a log of clusters or other sets of assets that each asset was grouped with over time. Because types and behaviors of assets of the same type (e.g., smartphones) may be expected to perform the same subset of tracked behaviors with similar frequencies over time the computer system can label a particular asset as posing a possible risk to the network if behaviors of this particular asset have shifted away from behaviors exhibited by assets in its previous cohort.

Specifically, behaviors of a particular asset type may change over time as applications and operating systems of assets of this asset type are updated, as this asset type is developed, as users find new uses or discard old uses for assets of this type, etc.; however, the types and frequencies of behaviors exhibited by assets of this type may generally be expected to remain similar over time, even if the specific type of these assets is not known. Therefore, the computer system can predict that a particular asset represents a threat to the network if types and/or frequencies of behaviors of the particular asset begin to deviate from types and/or frequencies of behaviors common to other assets historically grouped with the particular asset.

10.2 Asset Detection and Behaviors

In this variation, the method S100 includes: detecting a first set of assets connected to the computer network over a first period of time in Block S110; and detecting a first set of behaviors of assets connected to the network during the first period of time in Block S111. Generally, in Blocks S110 and S111, the computer system detects multiple assets on the network, detects behaviors of these assets while connected to the network, and links these behaviors to their originating assets.

In one implementation, the computer system implements methods and techniques described above to compile network behaviors detected over a period of time into one data structure per asset, wherein each data structure represents types and frequencies of behaviors performed by the corresponding asset of this period of time. For example, the computer system can transform a first set of behaviors—occurring on the network during the first period of time—into a set of multi-dimensional vectors, wherein each multi-dimensional vector represents frequencies of each behavior type, in the predefined set of behavior types described above, executed by a single corresponding asset during the first period of time, as shown in FIG. 4.

In the foregoing example, a vector can represent a rolling buffer of frequencies of a predefined set of behaviors performed by the corresponding asset over a preset period of time, such as one hour, one day, or one week; and the computer system can regularly recalculate a vector for an asset, such as once per ten-minute interval, once per hour, or once per day over which the asset has connected to the network. The computer system can then compare vectors of assets connected to the network, group assets exhibiting similar combinations and/or frequencies of behaviors in Blocks S116 and S126, detect migration of a particular asset away from behaviors common to other assets historically grouped with the particular asset (and toward behaviors common to another cluster of assets not historically grouped with the particular asset) in Block S130, and flag the particular asset for investigation accordingly in Block S150, as described below.

However, the computer system can compile an asset identifier and behavioral data of the asset into a data structure of any other type or format in Block S111.

10.2 Grouping Assets

In this variation, the method S100 includes Block S116, which recites partitioning a first set of assets into a first instance of a first cluster of assets and a first instance of a second cluster of assets, wherein assets in the first instance of the first cluster of assets exhibit similar behaviors during the first period of time, and wherein assets in the first instance of the second cluster of assets exhibit similar behaviors during the first period of time. (Block S116 can similarly include grouping a first set of assets into a first instance of a first cluster of assets and a first instance of a second cluster of assets based on similarities of behaviors associated with assets in the first set of assets.) Generally, in Block S116, the computer system can compare data structures representing behaviors of assets during similar periods of time to identify cohorts of assets likely to represent the same asset types.

In one implementation, the computer system executes clustering techniques, such as described above, to partition a corpus of vectors—each representing types and frequency of behaviors of the corresponding asset over a common period of time—into a set of clusters (e.g., "Voronoi cells"), wherein each cluster contains a set of vectors representing behaviors by a set of assets likely to be of the same immutable asset type. For example, the computer system can partition a multi-dimensional data space of monitored behavior type clusters of contemporary vectors representing assets likely to be of similar asset types in Block S116 by: grouping a first subset of assets—in the first set of assets detected on the network during a first period of time—into a first instance of a first cluster of assets based on proximity of vectors corresponding to assets in the first subset of assets; grouping a second subset of assets—in this first set of assets—into a first instance of a second cluster of assets based on proximity of vectors corresponding to assets in the second subset of assets; grouping a third subset of assets—in this first set of assets—into a first instance of a third cluster of assets based on proximity of vectors corresponding to assets in this third subset of assets; etc. for multiple other subsets of assets forming distinguish clusters.

In the foregoing implementation, the computer system can group (and distinguish) assets by similarity of types and frequencies of behaviors of these assets during the same or similar periods of time. In particular, the computer system can associate a particular asset with a first subset of assets—detected on the network in Block S110—based on proximity of a particular multi-dimensional vector representing behaviors of the particular asset to multi-dimensional vectors representing behaviors of assets in the first set of assets during the same or similar period of time. For example, the computer system can: calculate a first boundary encompassing vectors representing behaviors executed by assets in the first set of assets during the first period of time; and associate the particular asset with the first set of assets in response to the first vector of the asset falling inside of the first boundary. (The computer system can repeat this process over time, as described below, and flag the particular asset as representing a possible threat to the network at a later time if a vector representing the particular asset's behaviors at this later time falls outside of a boundary encompassing a comparable set of assets.)

However, the computer system can implement any other method or technique to group assets by similar types and frequencies of behaviors performed by these assets over the same or similar periods of time.

10.3 Group Revision

As described above, the computer system can regularly (e.g., intermittently) detect new instances of behaviors performed by assets on the network and recalculate partitions between data structures representing behaviors of these assets over time. In particular, this variation of the method S100 can include: Block S120, which recites over a second period of time succeeding the first period of time, detecting a second set of assets connected to the computer network; Block S121, which recites detecting a second set of behaviors occurring on the computer network over the second period of time and associating behaviors in the second set of behaviors with assets in the second set of assets; and Block S126, which recites grouping the second set of assets into a second instance of the first cluster of assets and a second instance of the second cluster of assets based on similarities of behaviors associated with assets in the second set of assets. For example, the computer system can implement methods and techniques described above: to recalculate vectors representing types and frequencies of behaviors performed by multiple assets connected to the network over a subsequent period of time; and to regroup these assets based on similarities of their corresponding vectors for this subsequent period of time.

As described above, assets of the same type may be expected to perform similar combinations and frequencies of behaviors over time. While types and frequencies of behaviors of assets of a particular type may not be identical, the types and frequencies of behaviors of these assets may vary within a relative narrow band; their representative vectors may therefore be expected to remain in relative proximity over time, even as applications, software updates, security patches, usages, users, etc. for this asset type are modified and updated over time. The computer system can therefore regularly compare behavioral data of a particular asset connecting to the network to confirm that the particular asset is still exhibiting behavioral characteristics similar to behavioral characteristics of other assets within which the particular asset was previously grouped. The computer system can implement this process for each asset (or each unmanaged asset) connecting to the network over time. However, if the computer system detects that a particular asset has moved away from its historical group of assets (e.g., a vector representing the particular asset's behaviors over a period of time has moved further from the centroid of a cluster of vectors representing behaviors of other assets historically grouped with the particular asset), the computer system can flag this particular asset as a potential threat to the network in Block S130.

For each asset connecting to the network, the computer system can also maintain a log of: asset clusters with which an asset has been grouped; identifiers of specific assets with which the asset has been grouped; distance from a vector representing the asset to the centroid of each cluster with which the asset has been grouped; etc. For each asset connecting to the network, the computer system can additionally or alternatively maintain a log of distances from a vector representing the asset to centroids of all clusters or a subset of clusters (e.g., the three nearest clusters) of assets. However, the computer system can implement any other method or technique to group assets exhibiting similar behaviors and can store a representation of these clusters in any other way in Blocks S116 and S126.

10.4 Deviation

This variation of the method S100 can further include Block S130, which recites identifying a particular asset that shifted from proximal the first instance of the first cluster toward the second instance of the second cluster from the first period of time to the second period of time. Generally, in Block S130, the computer system can detect and flag a particular asset that is not exhibiting types and/or frequencies of behaviors that differ substantively from types and/or frequencies of behaviors of other assets with which the particular asset was previously grouped (i.e., other assets in the particular asset's previous cohort or "primary cluster").

10.4.1 Distance to Centroid

In one implementation, the computer system tracks distances from vectors representing behaviors of a particular asset to the centroid of a nearest cluster of assets, centroids of multiple (e.g., three) nearest clusters, or centroids of all clusters of assets and then correlates changes in these distances—such as beyond a preset threshold magnitude, relative change, or rate of change, etc.—with risk that the asset poses to the network.

For example, the computer system can: compile vectors representing behaviors of a first set of assets connected to the network during a first period of time into a first instance of a first cluster of assets; calculate a first distance from a first vector representing behaviors of a particular asset during this same period of time to a centroid of the first instance of a first cluster of assets. Later, the computer system can repeat this process to: compile vectors representing behaviors of the same or a similar set of assets connected to the network during a second period of time into a second instance of the first cluster of assets; calculate a second distance from a second vector representing behaviors of the particular asset during this second period of time to a centroid of the second instance of a first cluster of assets. The computer system can then calculate a security risk score for the particular asset as a function of a difference between the first distance and the second distance. In this example, if the particular asset moves closer to the centroid of the first cluster (e.g., its primary or nearest cluster), the computer system can ignore this change, since the particular asset is behaving (even) more like other assets in its cluster. However, if the particular asset moves away from the first cluster and closer to the centroid of the second cluster (i.e., not its primary or nearest cluster), such as outside a boundary of the first cluster and into the boundary of the second cluster, the computer system can associate the particular asset with an elevated risk score. For example, the computer system can calculate a risk score proportional to the change in distance from the particular asset to the centroid of its primary cluster and inversely proportional to the change in distance from the asset to the centroid of the second cluster.

10.4.2 Primary Cluster

The computer system can also identify the particular asset's primary cluster based on frequency or a duration of time over which the particular asset has been assigned this same cluster. For example, the computer system can calculate a confidence score for correlation between the particular asset and its primary cluster of assets proportional to a duration of time that the particular asset previously coincided with (e.g., fell within the boundary of, within a threshold distance of the centroid of, or within a least squares distance of other assets in) the primary cluster of assets. In this example, as the confidence score that the particular asset belongs to the primary cluster increases, the computer system can calculate increasing risk scores for the asset as vectors representing behaviors of the particular asset move away from the primary cluster. Alternatively, in Block S150, the computer system can generate a security alert to investigate the particular asset in response to both: the confidence score for the particular asset belonging to the primary cluster exceeding a confidence threshold; and the particular asset shifting from the primary cluster toward a second cluster, such as by more than a threshold distance.

The computer system can therefore associate a particular asset with a primary cluster of assets (e.g., predict that the particular asset and other assets in the same primary cluster represent the same asset type) based on strong similarities between types and frequencies of behaviors of the particular asset and other assets in the primary cluster. The computer system can regularly reassess the particular asset's primary cluster; the computer system can later flag the particular asset for investigation in Block 130 in response to association of the particular asset with a second cluster containing a second set of assets historically disjoint from (e.g., containing few or no assets from) the first set of assets in the primary cluster previously assigned to the particular asset.

10.4.3 Deviation Direction

As described above, the computer system can flag a particular asset if the particular asset has moved away from its primary cluster and toward a second cluster over two or more network scans. Specifically, the computer system can flag the particular asset if vectors representing behaviors of the particular asset over time begin to trend away from a cluster of vectors representing behaviors of other assets that previously exhibited (strong) behavioral similarities with the particular asset.

In one example shown in FIG. 3, the computer system can: calculate a first vector representing frequencies of behaviors of the particular asset over a first period of time; calculate a first distance from the first vector to a centroid of a first instance of a first (or primary) cluster of assets; calculate a second distance from the first vector to a centroid of a first instance of a second (e.g., secondary or second-nearest) cluster of assets; calculate a second multi-dimensional vector representing frequencies of behaviors of the particular asset over the second period of time; calculate a third distance from the second vector to a centroid of a second instance of the first cluster of assets; and calculate a fourth distance from the second vector to a centroid of a second instance of the second cluster of assets. In this example, the computer system can then generate a security alert to investigate the particular asset if the third distance exceeds the first distance and if the second distance exceeds the fourth distance. Specifically, in this example, the computer system can generate a security alert to investigate the particular asset if vectors representing behaviors of the particular asset over time have shifted from inside or adjacent an historical primary asset cluster of the particular asset toward another asset cluster, such as an historically secondary asset cluster.

The computer system can implement similar methods and techniques to flag the particular asset in response to the particular asset moving away from its primary cluster—and not necessarily toward a second cluster—as shown in FIG. 3.

10.4.4 Deviation Rate

The computer system can also flag the particular asset and calculate a risk score for the asset as a function of a rate at which the particular asset drifts away from its primary cluster (and/or toward a second cluster). Specifically, the computer system can calculate a risk score for a particular asset as a function of a rate at which vectors representing behaviors of the particular asset over time trend away from a cluster of vectors representing behaviors of other assets that previously exhibited (strong) behavioral similarities with the particular asset.

For example, the computer system can: calculate a deviation rate of the particular asset from its primary cluster of assets toward a second cluster of assets from the first period of time (e.g., a first network scan) and the second period of time (e.g., a subsequent network scan); and then calculate a security risk score for the particular asset as a function of this deviation rate in Block S130. The computer system can similarly calculate an average or peak deviation rate of the particular asset away from its primary cluster (and/or toward another cluster) over a larger sequence of network scans. The computer system can then generate a security alert to investigate the particular asset in Block S150 in response to the security risk score exceeding an alert threshold score, such as described above.

10.4.5 Boundary

The computer system can also detect deviation of the particular asset from its primary cluster based on whether a vector representing behaviors of the particular asset falls within a prescribed boundary containing vectors representing behaviors of other assets in the cluster. For example, the computer system can: calculate a first boundary encompassing vectors representing behaviors executed by assets in a first set of assets during a first period of time; and associate the particular asset with the first set of assets in response to a first vector representing behaviors of the asset falling inside of the first boundary. The computer system can repeat this process over time to: recalculate the boundary of the first set of assets, which may grow or shrink over time as like assets connect to and leave the network; and flag the particular asset as representing a possible threat to the network at a later time if a vector—representing the particular asset's behaviors at this later time—falls outside of a boundary encompassing this first set of assets.

However, in this variation, the computer system can implement any other method or technique to detect a decrease in behavioral similarity between a particular asset and other assets with which the particular asset previously exhibited sufficient or strong behavioral similarity in Block S130. In this variation, the computer system can also flag the particular asset and/or calculate a risk score for the particular asset according to any other schema in Block S140.

11. Risky Asset Handling

Block S150 of the method S100 recites, generating a security alert for the asset based on a difference between the first similarity score and the second similarity score. Generally, in Block S150, the computer system executes an action to handle an asset associated with a risk score exceeding a threshold risk score.

11.1 Triggers

In one implementation shown in FIGS. 1, 2, and 3, the computer system generates an alert in response to the risk score of the asset exceeding a preset threshold risk score. For example, the computer system can implement the foregoing methods and techniques to calculate a risk score for the asset based on a difference between similarity scores calculated for the asset over pairs of consecutive network scan periods and then flag the asset in Block S150 if a single calculated risk score exceeds a threshold risk score (e.g., 60%). The computer system can also compare risk scores calculated for the asset over time and flag the asset in Block S150 if risk scores calculated for the asset exceed the preset threshold risk score for a minimum number of consecutive network scan periods. For example, the computer system can label the asset as a security risk and execute Block S150 if at least six of ten consecutive risk scores calculated for the asset exceed the threshold risk score of 40% (or "moderate risk"). Similarly, the computer system can maintain a running average of a number (e.g., ten) of consecutive risk scores associated with the asset and respond to the asset in Block S150 if the average risk score exceeds a threshold risk score (e.g., 50%).

11.2 Alerts

In response to the risk score of the asset exceeding the threshold risk score, the computer system can flag the asset as a possible security threat and then generate an alert to investigate the asset accordingly in Block S150. For example, in Block S150, the computer system can: generate a security alert to investigate the particular asset; and populate the alert with an identifier of the machine (e.g., a MAC address, an IP address) and a user account identifier of the particular asset. The computer system can also populate the alert with additional asset data, such as predicted asset types of the asset before and after a change that triggered the alert and/or a list of new behaviors (e.g., processes or protocols) executed by the asset, etc. The computer system can then insert the alert to an alert feed, such as an alert feed of an external security operation center (or "SOC").

(The computer system can additionally or alternatively combine this alert with other alerts generated by external detection mechanisms on the network responsive to other network activity to form a composite alert, such as described in U.S. patent application Ser. No. 15/628,520, filed on 20 Jun. 2017, which is incorporated in its entirety by this reference.)

11.3 Quarantine

Furthermore, in response to the risk score of the asset exceeding the threshold risk score, the computer system can additionally or alternatively quarantine the asset or remove (e.g., reject) the asset from the network entirely. For example, the computer system can maintain both: an asset threshold risk score—such as generic to various computer networks or customized for the current computer network—for triggering an alert to investigate an asset; and a quarantine threshold score that is greater than the alert threshold score and trigger automatic quarantine of an asset in response to a security risk score of an asset exceeding the quarantine threshold score.

However, the computer system can respond to an elevated risk score for an asset in any other way in order to reduce or contain risk that the asset may pose to the network. In particular, in Block S150, the computer system can implement any other methods and techniques to generate a security alert to investigate the particular asset, automatically quarantine the particular asset, or otherwise respond to deviation of the particular asset from types and/or frequencies of behaviors common to a predicted asset type of the particular asset or common to other assets predicted to be like the asset in the past.

12. Asset Labeling

Following an investigation into an asset triggered by the computer system in Block S150, a security analyst can label the asset with its true asset type (e.g., mainframe computer; server; switch; desktop or notebook computer; smartphone; etc.) and the determined security risk of the asset. In the implementation described above in which the computer system calculates cohorts of like assets (e.g., via corresponding points placed within asset maps), the computer system can write the asset type label provided by the security analyst to the original cohort of the asset, thereby labeling this cohort and other assets within it with a known asset type. The computer system can also apply results of the investigation: to a risk score model for calculating risk scores of assets in this cohort; and/or to a risk score threshold for triggering an alert for an asset. For example, if the investigation into the asset returned a negative result for a determined security risk of the asset, the computer system can expand a boundary around a cohort of points representing like assets in asset maps; and vice versa. In another example, the computer system can increase the security risk threshold if the investigation into the asset returned a negative result; and vice versa.

13. Cross-Network Threat Detection

The computer system can also implement the foregoing methods and techniques to: track various assets throughout multiple networks; track changes in asset type similarity scores of these assets; correlate changes in asset type similarity scores with increased security risks in corresponding networks; trigger investigations into assets representing higher risks to their respective networks; collect investigation results from (human and computer) security analysts; and leverage results of investigations across these networks to improve asset labeling, risk score calculation, and alert generation unilaterally across these networks.

The computer systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for predicting security risks of assets on a computer network, the method comprising:
   over a first period of time, discovering an asset connected to the computer network;
   associating a first set of behaviors detected on the computer network during the first period of time with the asset;
   calculating a first similarity score representing similarity between the asset and a first asset type based on the first set of behaviors associated with the asset;
   storing the first similarity score with an identifier of the asset;
   over a second period of time succeeding the first period of time, identifying the asset connected to the computer network;
   associating a second set of behaviors detected on the computer network during the second period of time with the asset;
   calculating a second similarity score representing similarity between the asset and the first asset type based on the second set of behaviors associated with the asset; and
   generating a security alert for the asset based on a difference between the first similarity score and the second similarity score,
   wherein generating the security alert for the asset comprises:
      calculating a deviation rate that measures deviation over time of the asset from the first asset type based on the first similarity score, the second similarity score, and a time between the first period of time and the second period of time;
      calculating a security risk score for the asset as a function of the deviation rate; and
      generating the security alert for the asset in response to the security risk score exceeding an alert threshold score; and
   wherein calculating the deviation rate of the asset from the first asset type comprises computing the deviation rate of the asset from the first asset type over a sequence of scans of the computer network.

2. The method of claim 1:
   wherein calculating the first similarity score comprises transforming the first set of behaviors, recorded during the first period of time and associated with the asset, into a first multi-dimensional vector representing frequencies of each behavior type, in a predefined set of behavior types, executed by the asset during the first period of time;
   wherein calculating the first similarity score comprises calculating the first similarity score proportional to a distance from the first vector to a first model vector representing the first asset type;
   wherein calculating the second similarity score comprises transforming the second set of behaviors, recorded during the second period of time and associated with the asset, into a second multi-dimensional vector representing frequencies of each behavior type, in the predefined set of behavior types, executed by the asset during the second period of time; and
   wherein calculating the second similarity score comprises calculating the second similarity score proportional to a distance from the second vector to the first model vector.

3. The method of claim 1, further comprising automatically quarantining the asset from the computer network in response to the security risk score exceeding a quarantine threshold score, the quarantine threshold score greater than the alert threshold score.

4. The method of claim 1:
   wherein discovering the asset comprises:
      detecting the identifier of a machine connected to the computer network;
      detecting a user account accessed by the machine; and
      defining the asset according to the identifier of the machine and the user account; and
   wherein generating the security alert comprises uploading the security alert, identifying the machine and the user account, to an alert feed at an external security operation center.

5. The method of claim 1, wherein calculating the first similarity score is based at least on an asset model that represents behaviors of assets of the first asset type within a limited set of one or more timeframes.

6. The method of claim 1, further comprising recalculating a boundary of the first asset type, to accommodate drift in behaviors associated with the first asset type over time.

7. The method of claim 1, wherein generating the security alert for the asset is performed in response to security risk scores associated with the asset exceeding the alert threshold score for at least a minimum plurality of scans of the computer network.

8. The method of claim 1, further comprising:
   subsequent to generating the security alert, receiving user input associated with a security investigation of the asset; and adjusting the alert threshold score based at least on the user input.

9. A method for predicting security risks of assets on a computer network, the method comprising:
over a first period of time:
detecting a first set of assets connected to the computer network; and
detecting a first set of behaviors by the first set of assets connected to the computer network;
partitioning the first set of assets into a first instance of a first cluster of assets and a first instance of a second cluster of assets, assets in the first instance of the first cluster of assets exhibiting similar behaviors during the first period of time, and assets in the first instance of the second cluster of assets exhibiting similar behaviors during the first period of time;
over a second period of time succeeding the first period of time:
detecting a second set of assets connected to the computer network; and
detecting a second set of behaviors by the second set of assets connected to the computer network;
partitioning the second set of assets into a second instance of the first cluster of assets and a second instance of the second cluster of assets, assets in the second instance of the first cluster of assets exhibiting similar behaviors during the second period of time, and assets in the second instance of the second cluster of assets exhibiting similar behaviors during the second period of time;
identifying a particular asset that shifted from proximal the first instance of the first cluster toward the second instance of the second cluster from the first period of time to the second period of time; and
generating a security alert to investigate the particular asset,
wherein generating the security alert comprises:
calculating a deviation rate that measures deviation over time of the particular asset from the first cluster of assets toward the second cluster of assets between the first period of time and the second period of time;
calculating a security risk score for the particular asset as a function of the deviation rate; and
generating the security alert for the particular asset in response to the security risk score exceeding an alert threshold score; and
wherein calculating the deviation rate of the particular asset from the first cluster of assets comprises computing the deviation rate of the particular asset from the first cluster of assets over a sequence of scans of the computer network.

10. The method of claim 9, wherein partitioning the first set of assets into the first instance of the first cluster of assets and the first instance of the second cluster of assets comprises:
transforming the first set of behaviors, recorded during the first period of time, into one multi-dimensional vector per asset in the first set of assets, each multidimensional vector representing frequencies of each behavior type, in a predefined set of behavior types, executed by a corresponding asset during the first period of time;
grouping a first subset of assets in the first set of assets into the first instance of the first cluster of assets based on proximity of vectors corresponding to assets in the first subset of assets; and
grouping a second subset of assets in the first set of assets into the first instance of the second cluster of assets based on proximity of vectors corresponding to assets in the second subset of assets.

11. The method of claim 9, wherein generating the security alert comprises:
calculating a confidence score for correlation between the particular asset and the first cluster of assets proportional to a duration of time that the particular asset previously coincided with the first cluster of assets; and
generating the security alert to investigate the particular asset in response to the confidence score exceeding a confidence threshold and in response to the particular asset shifting from the first cluster toward the second cluster by more than a threshold distance from the first period of time to the second period of time.

12. The method of claim 9, further comprising automatically quarantining the particular asset from the computer network in response to the security risk score exceeding a quarantine threshold score, the quarantine threshold score greater than the alert threshold score.

13. The method of claim 9:
wherein detecting the first set of assets connected to the computer network over the first period of time comprises detecting unmanaged assets connecting to an internal computer network over the first period of time; and
wherein detecting the first set of behaviors occurring on the computer network over the first period of time comprises detecting computer network requests and network traffic originating at unmanaged assets connected to the internal computer network.

14. The method of claim 9:
wherein detecting the first set of assets connected to the computer network over the first period of time comprises, for each asset:
detecting an identifier of a machine connected to the computer network;
detecting a user account accessed by the machine; and
defining the particular asset according to the identifier of the machine and the user account; and
wherein generating the security alert comprises writing the security alert, identifying a machine and a user account of the particular asset, to an alert feed at an external security operation center.

15. A method for predicting security risks of assets on a computer network, the method comprising:
over a first period of time:
detecting an asset connected to the computer network; and
detecting a first set of behaviors exhibited by the asset connected to computer network during the first period of time;
associating the asset with a first set of assets based on similarity of the first set of behaviors to behaviors characteristic of the first set of assets;
over a second period of time succeeding the first period of time:
detecting the asset connected to the computer network; and
detecting a second set of behaviors exhibited by the asset connected to the computer network during the second period of time;
detecting deviation of the asset from the first set of assets based on differences between the second set of behaviors and behaviors characteristic of the first set of assets; and
generating a security alert for the asset in response to deviation of the asset from the first set of assets, wherein generating the security alert for the asset comprises:
- calculating a rate of deviation that measures deviation over time of the asset from the first set of assets from the first period of time and the second period of time;
- calculating a security risk score for the asset as a function of the rate of deviation; and
- generating the security alert for the asset in response to the security risk score exceeding an alert threshold score; and wherein calculating the deviation rate of the asset from the first set of assets comprises computing the deviation rate of the asset from the first set of assets over a sequence of scans of the computer network.

16. The method of claim 15, wherein detecting deviation of the asset from the first set of assets comprises:
- grouping the asset with a second set of assets based on similarity of the second set of behaviors to behaviors characteristic of the second set of assets, the second set of assets comprising unmanaged assets distinguishable from unmanaged assets of the first set of assets; and
- flagging the asset in response to grouping the asset with unmanaged assets in the second set of assets rather than with unmanaged assets of the first set of assets.

17. The method of claim 15:
wherein associating the asset with the first set of assets comprises:
- transforming the first set of behaviors, recorded during the first period of time and associated with the asset, into a first multi-dimensional vector representing frequencies of each behavior type, in a predefined set of behavior types, executed by the asset during the first period of time; and
- associating the asset with the first subset of assets based on proximity of the first multi-dimensional vector to multi-dimensional vectors representing behaviors executed by assets in the first subset of assets during the first period of time; and wherein detecting deviation of the asset from the first set of assets comprises:
- transforming the second set of behaviors, recorded during the second period of time and associated with the second asset, into a second multi-dimensional vector representing frequencies of each behavior type, in the predefined set of behavior types, executed by the asset during the second period of time; and
- detecting deviation of the second multi-dimensional vector from multidimensional vectors representing behaviors executed by assets in the first set of assets during the second period of time.

18. The method of claim 17:
wherein associating the asset with the first set of assets comprises:
- calculating a first boundary encompassing multi-dimensional vectors representing behaviors executed by assets in the first set of assets during the first period of time; and
- associating the asset with the first set of assets in response to the first multidimensional vector of the asset falling inside of the first boundary; and wherein detecting deviation of the asset from the first set of assets comprises:
- calculating a second boundary encompassing multi-dimensional vectors representing behaviors executed by assets in the first set of assets during the second period of time; and
- detecting deviation of the asset from the first set of assets in response to the second multi-dimensional vector of the asset falling outside of the second boundary.

19. The method of claim 15, wherein generating the security alert for the asset further comprises:
- uploading the security alert to an alert feed at a security operation center.

* * * * *

UNITED STATES PATENT AND TRADEMARK OFFICE
CERTIFICATE OF CORRECTION

Page 1 of 1

PATENT NO. : 10,855,715 B2
APPLICATION NO. : 15/799827
DATED : December 1, 2020
INVENTOR(S) : Gregory Martin et al.

It is certified that error appears in the above-identified patent and that said Letters Patent is hereby corrected as shown below:

In the Specification

Column 1, Line 48, delete "Silo" and insert -- S110 --.
Column 5, Line 43, delete "110" and insert -- S110 --.
Column 5, Line 56, delete "110" and insert -- S110 --.
Column 8, Line 4, delete "Sm" and insert -- S111 --.
Column 12, Line 55, delete "Silo" and insert -- S110 --.

Signed and Sealed this
Fifth Day of January, 2021

Andrei Iancu
*Director of the United States Patent and Trademark Office*